July 21, 1959 L. S. WILLIAMS 2,895,726
BALL BEARING SCALE PIVOTS
Filed June 7, 1954 3 Sheets-Sheet 1
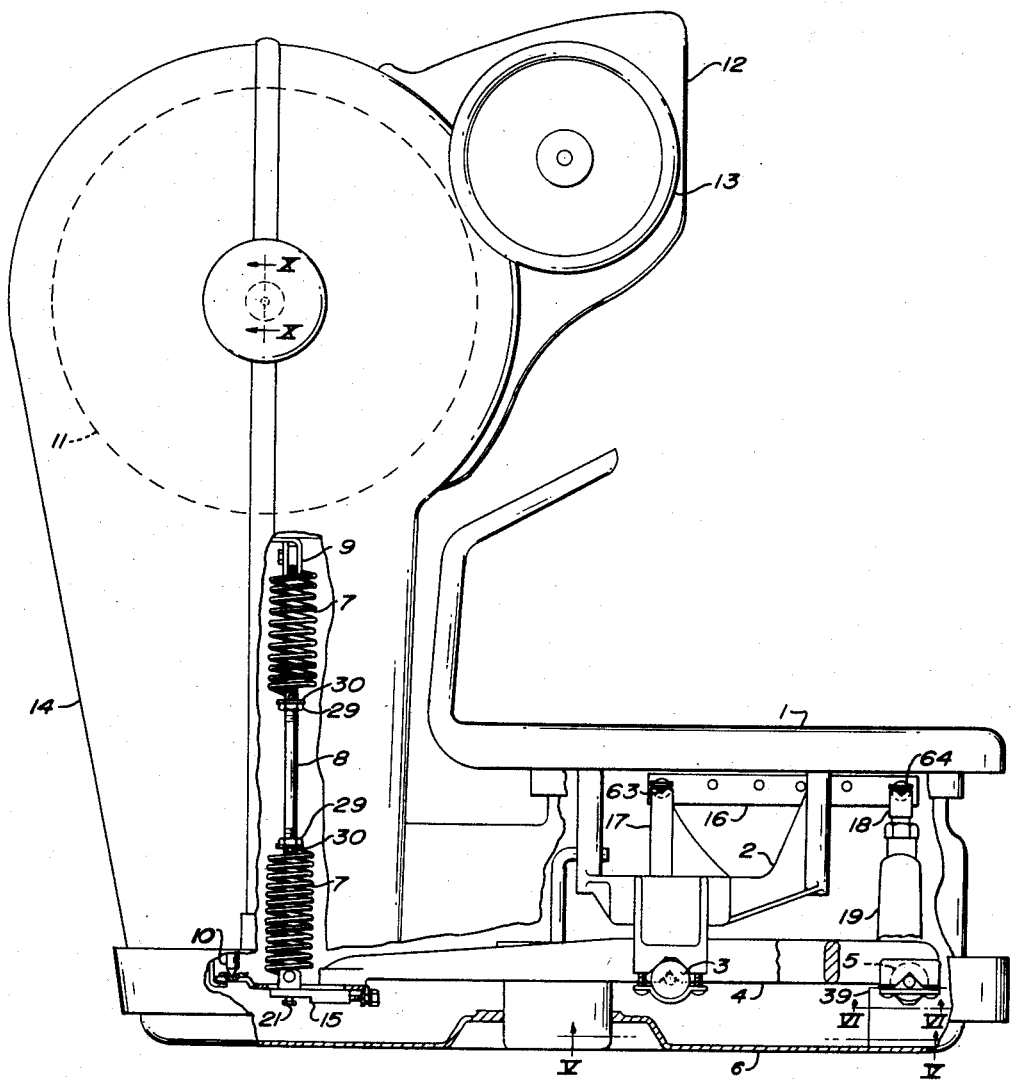
Fig. I
INVENTOR.
LAWRENCE S. WILLIAMS
BY
Marshall, Marshall & Yeasting
ATTORNEYS July 21, 1959     L. S. WILLIAMS     2,895,726
BALL BEARING SCALE PIVOTS
Filed June 7, 1954     3 Sheets-Sheet 2
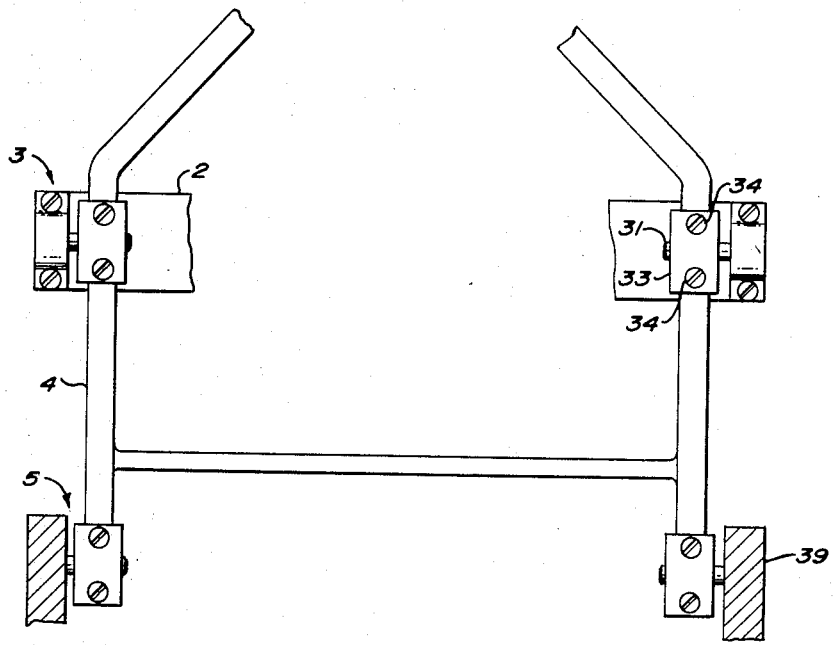
Fig. V
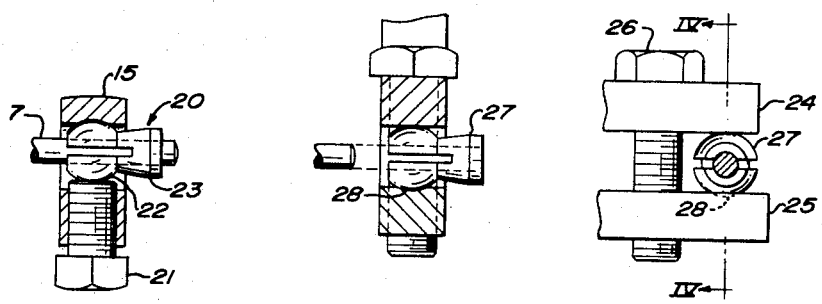
Fig. II     Fig. IV     Fig. III
INVENTOR.
LAWRENCE S. WILLIAMS
BY
Marshall, Marshall & Yeasting
ATTORNEYS July 21, 1959
L. S. WILLIAMS
2,895,726
BALL BEARING SCALE PIVOTS
Filed June 7, 1954
3 Sheets-Sheet 3
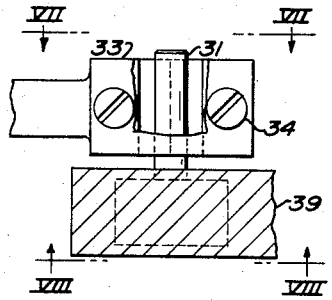
_Fig_ VI
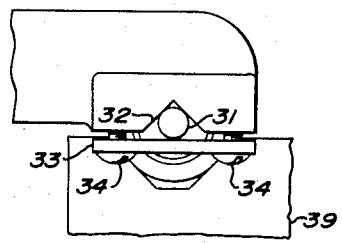
_Fig_ VII
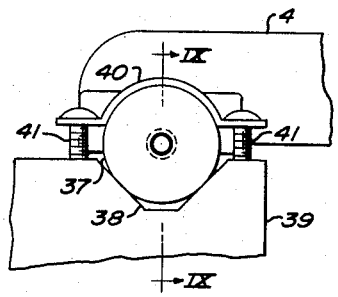
_Fig_ VIII
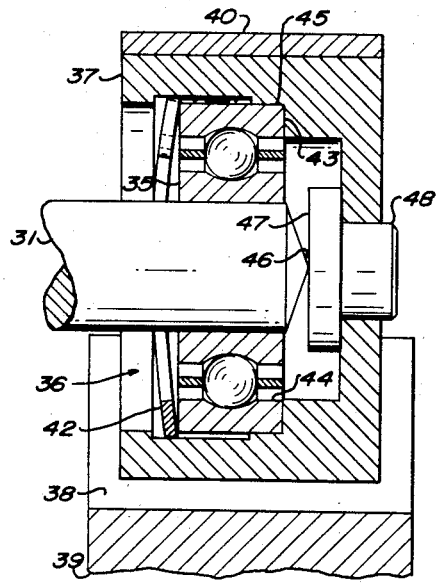
_Fig_ IX
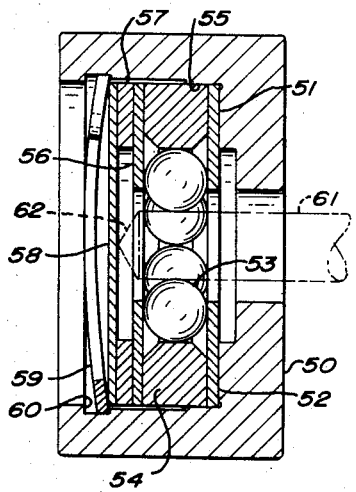
_Fig_ X
INVENTOR.
LAWRENCE S. WILLIAMS
BY
Marshall, Marshall & Yeasting
ATTORNEYS United States Patent Office 2,895,726
Patented July 21, 1959

2,895,726
BALL BEARING SCALE PIVOTS

Lawrence S. Williams, Toledo, Ohio, assignor, by mesne assignments, to Toledo Scale Corporation, Toledo, Ohio, a corporation of Ohio Application June 7, 1954, Serial No. 434,759

5 Claims. (Cl. 265—27)

This invention relates to weighing scales and in particular to improvements in construction and design of counter type weighing scales such as are used in groceries and retail meat markets.

In the design of an automatic weighing scale it is necessary to minimize or completely eliminate all static friction between the various parts of the weighing mechanism. Static friction may occur from misalignment of knife edges and bearings or from the sliding of one part over another during movement of the load counterbalancing members. In addition to the friction in the pivotal connections friction often occurs in spring scales if that portion of the load counterbalancing spring entering its mounting rubs or slips in the mounting during the application or removal of load from the weighing mechanism.

In order to minimize friction in the pivotal connections it has often been proposed that ball bearings be substituted for knife edges and V-bearings. Such constructions have not in general proven satisfactory because of the tendency of ball bearings to develop binding action between the races and the balls for small amounts of misalignment and because of the tendency of the balls to indent the races when loads are repeatedly applied without rotation of the bearings. Another disadvantage of the ordinary type ball bearing is that its frictional characteristics are extremely sensitive to stresses applied to the outer race tending to distort the bearing and thus cause binding of the balls in the races.

The principal object of this invention is to provide an improved weighing scale using ball bearing assemblies as pivotal connections, the bearings being mounted in a manner such that no binding of the bearings may occur as the bearing races are clamped in position.

Another object of the invention is to provide a simple accurate weighing scale structure that is easy to manufacture to a high degree of precision.

A still further object of the invention is to improve the mounting between a load carrying lever and a load counterbalancing spring so as to minimize any possibility of static friction occurring between the spring and the mounting.

Other objects and advantages are apparent from the following description of a preferred embodiment of the invention.

According to the invention the ordinary knife edge and V-bearing pivots of a scale are replaced with ball bearings mounted in special housings constructed so that the bearings are held in precisely accurate spacing and alignment and are free from any strain resulting from the force applied by the clamping mechanism. The invention further contemplates a clamping arrangement for the ends of a weighing spring arranged to prevent any relative motion between the end of the spring and the member to which it is clamped.

The improved mounting for the ball bearings employed as pivotal connections consists of two V-grooves or similar grooves in the members to be pivotally connected, one of the grooves being adapted to receive a stud the axis of which extends along the pivot axis into the ball bearing and the other V-groove being adapted to receive a housing for the ball bearing. The ball bearing assembly and in particular the outer race of the bearing is located in its housing by contact of one face of the race with a radial surface of the housing and contact of the marginal area only of the outer race with a stepped bore of the housing. The members to be pivotally connected may also include the chart shaft and the frame of the scale that supports the chart.

A preferred embodiment of the invention is illustrated in the accompanying drawings.

In the drawings:

Figure I is a side elevation with parts broken away to show the improved pivotal connections, spring mountings, and chart mounting in their relative positions in a weighing scale suitable for use in a retail market.

Figure II is a vertical section, at enlarged scale, showing the connection between the lower end of a load counterbalancing spring and a lever to which it is connected.

Figure III is a view, at enlarged scale, of a clamping mechanism suitable for use at the upper end of the load counterbalancing spring.

Figure IV is a section taken substantially along the line IV—IV of Figure III.

Figure V is a bottom view of the lever and parts connected thereto as seen from the line V—V of Figure I.

Figure VI is a bottom view of a fulcrum bearing support as seen from the line VI—VI of Figure I.

Figure VII is a side elevation of the fulcrum bearing as seen from the line VII—VII of Figure VI.

Figure VIII is a side elevation of the fulcrum bearing as seen from the line VIII—VIII of Figure VI.

Figure IX is an enlarged vertical section of the ball bearing mounted in its housing, as seen from the line IX—IX of Figure VIII, the bearing serving as the fulcrum or load pivot connection for supporting or transmitting load to the weighing scale lever.

Figure X is an enlarged vertical section of the improved bearing taken along the line X—X of Figure I as used for rotatably mounting a chart shaft.

These specific figures and the accompanying description are intended merely to illustrate the invention but not to impose limitations on the claims.

Referring to Figure I the force of gravity acting on a load placed on a load receiver 1 is transmitted through a spider 2 and load bearings 3 to a lever 4 fulcrumed on bearings 5 in a base 6 of the scale. These load forces acting on the lever 4 are transmitted to a load counterbalancing spring 7, divided into an upper and lower section by an intermediate strut or tension member 8. The upper end of the spring is connected through a clamp 9 to a portion of the frame of the weighing scale.

The extension of the spring 7, which is proportional to the load on the scale, permits the spring supported end of the lever 4 to drop a distance proportional to the load and this movement is transmitted through a linkage including a strut 10, a cross lever, and a rack and pinion (not shown) to rotate a cylindrical chart 11 through equal increments of angle for equal increments of load on the scale. The chart 11 is provided with indicia that may be viewed through a window 12 and a magnifying lens (not shown) which is positioned along a path parallel to the axis of the chart 11 by means of a hand wheel 13. The chart 11 and the mechanical connection between the chart and the lever are enclosed in a housing 14 erected from the rear portion of the base 6 of the scale and including a generally cylindrical shell encasing the chart 11.

Since it is usually impossible to wind springs to have exactly a certain load carrying capacity at a certain extension, means are provided in a form of an adjustable nose iron 15 attached to the lever 4 to vary the connection point between the spring 7 and the lever 4. Thus if the spring 7 is too stiff the nose iron 15 is moved toward the fulcrum of the lever 4 thereby increasing the force applied to the spring and thereby increasing the deflection for a given unit of a load placed on the load receiver 1. Conversely if the spring is too weak such that the spring extension or movement of the lever 4 and strut connection 10 is too great for the correct indication of load the nose iron 15 may be moved to the left, away from the fulcrum axis, to increase the mechanical advantage of the spring 7 and thus reduce its extension for a given load applied to the load receiver 1. The zero position of the chart 11 is adjusted by an adjustable connection in the drive between the strut 10 and the rack and pinion that drives the chart.

The spider 2 supporting the load receiver is held in upright position by check link 16 having one end pivotally connected to a post 17 of the spider and having its other end pivotally connected to an adjustable upper section 18 of a check link post 19 erected from the frame or base 6 of the scale.

The connection between the spring 7 and its mountings is shown more clearly in Figures II, III and IV. As shown in Figure II the lower end of the spring 7 is slipped through a small fitting 20 that is clamped in a transverse hole in the upper part of the nose iron 15 by a screw 21 threaded upwardly through the lower portion to intersect the hole. The fitting 20 has a cylindrical bore to just fit the wire of the spring 7 and has an outer configuration that includes a spherical portion 22 and a generally conical section 23 expanding from a neck connecting it to the spherical portion 22. The spherical section is split with the cut extending along the axis of the fitting through the spherical end of the fitting, through the neck and approximately halfway through the conical portion. When this fitting 20 is slipped over the end of the wire of the spring 7 and is clamped in the bore of the nose iron 15 by tightening the screw 21 the fitting grips the spring wire with the maximum force or pressure occurring at the side of the spherical section remote from the conical portion. As assembled, this is the portion of the clamped end of the spring leading to the coils of the spring and is the part in which friction must be avoided. The spherical sections 22 of the fitting 20 act much like the prongs of a pair of tweezers wherein the maximum pressure is developed at the tips remote from the hinge or joint between the prongs. In this form of clamp any bending of the spring 7 as load is applied to the scale causes very little, if any, relative motion or slipping between the bore of the spherical section 22 of the fitting 20 and the wire 7. This arrangement thus avoids the possibility of slipping friction which would appear as hysteresis in the scale, i.e., a difference in weight indication for a given load depending upon whether the loads are being applied to the scale or removed from the scale.

The upper end of the spring is clamped in a generally similar manner except that the clamp comprises a pair of jaws 24 and 25 one fixed and one adjustable. Preferably the jaw 25 is fixed to the frame of the scale and the jaw 24 is drawn into clamping contact by a clamp screw 26. The jaws may extend horizontally as shown in Figure III or vertically as shown in Figure I. A fitting 27, similar to the fitting 20, is slipped onto the end of the spring wire of the spring and is clamped between the jaws 24 and 25. Preferably the jaw 25, the fixed jaw, is dented or provided with a small recess 28 adapted to receive the spherical portion of the fitting 27 and thus securely locate it in position as it is clamped by tightening the screw 26.

Referring again to Figure I the intermediate ends of the two parts of the spring 7 are connected to the connecting strut 8 by inserting the spring wire through holes in the strut 8 and clamping it in place with nuts 29 threaded onto the strut 8 and engaging washers 30 adapted to force the spring wire tightly against the sides of the holes through the strut 8. It should be noted that in this arrangement the ends of the springs 7 connected to the frame and the lever are rigidly connected to such members and that the strut 8 serves as a rigid interconnecting member between the two sections of the spring. By eliminating the pivotal connections commonly employed between the load counterbalancing springs and the cooperating parts of a scale several points of friction are eliminated. As a result, when employing high quality springs, there is very little hysteresis or difference in the indication of a given load depending upon whether the load is being increased or decreased.

Referring now to Figures V, VI, VII and VIII, which show the pivotal connections for connecting the lever to the spider 2 and to the base 6 of the scale, each of the connections shown in Figure V, the bottom view of the lever 4, consists of a stud 31 that is positioned in a transverse groove 32 milled in the underside of the lever and clamped by a cover plate 33 attached to the lever 4 by means of a pair of screws 34. The grooves 32 for the fulcrum axis and for the load pivot axis of the lever may be milled in the lever 4 at the same time by employing two milling cutters spaced apart on an arbor and arranged to cut both sets of grooves with one pass of the lever through the machine. By arranging the cutters to perform both cutting operations at the same time the parallelism and relative spacing of the grooves is accurately controlled without requiring equally great precision in the setting of the machine or the clamping of the lever into a holding fixture.

The studs 31 extend laterally either side of the side portions of the lever 4. The studs are extended inwardly (toward each other) or outwardly (as shown) according to the available space and required lateral stability. The studs engage inner races 35 (see Figure IX) of ball bearings 36 mounted within cup-shaped housings 37 that are clamped in V-grooves 38 of the pedestals 39 of the base 6 or the lower extremities of the spider 2. As seen in Figure VIII the bearing housings 37 are clamped in position in the V-grooves 38 by straps 40 fitting over the housings and held in place by screws 41. The grooves 38 in the pedestals 39 may be produced by a simple shaping or milling operation to finish rough grooves molded into the base casting. Likewise, the corresponding grooves in the lower ends of the spider 2 may be milled without difficulty.

Referring now in particular to Figure IX, the ball bearing 36 is held in the bearing housing 37 by a generally C-shaped annular washer or retaining spring 42 that is known on the market as a "Tru-arc" ring. These particular rings are C-shaped in form, almost a complete circle, are bowed laterally like a tension washer, and are inserted into the bore or interior of a housing by a tool which fits the ends of C-shaped and compresses or draws them together to reduce the diameter of the ring. Once in position and the force of the tool relieved, the ring expands to accurately and tightly fit the annular groove in which it is placed.

The housing 37 is generally cup-shaped in form and includes a radial surface or shoulder 43 adapted to axially position an outer race 44 of the ball bearing 36. The bearing is held against radial movement by a narrow ledge 45 of the bearing housing that fits the marginal portion only of the outer race 44 of the bearing. This particular arrangement with the narrow shoulder and ledge 43 and 45, engaging the edge and margin of the outer race 44 of the ball bearing is of particular advantage in reducing the stresses that can be applied to the ball bearing by the clamps used to hold the housing 37 in the groove 38. The end wall of the housing 37 including the shoulder 43 and the narrow circumferential ledge 45 holding the bearing have relatively large radial thickness and are able therefore to withstand great clamping force without distortion. The lip of the cup, the portion remote from the shoulders, is much weaker and clamping forces applied to the housing near the open end of the cup are apt to cause distortion of that portion of the housing. In the arrangement shown, however, this distortion of the rim of the housing has little effect on the ball bearing because most of the distortion occurs in that portion of the housing that is relieved so as not to contact the bearing at all. In order to minimize end thrust which would increase the friction in the ball bearing the stud 31 is made to have a close slip fit in the inner race 35. The stud 31 is positioned axially by contact between its hardened conical tip 46 and a hardened face 47 of a tenoned plug 48 set in the housing co-axially with respect to the stud 31.

While a tenoned stud 48 having a hardened face 47 to receive the end thrust of the stud 31 is shown in Figure IX this is only one of several constructions that may be used. For example, a hardened disk to fit the cavity in the housing may be dropped into place before the bearing is installed. The use of a disk as thrust member is illustrated in Figure X in connection with a bearing used for supporting a chart shaft of the scale.

Referring to Figure X in detail, the chart shaft bearing shown therein comprises a housing 50 adapted to be clamped in a frame member of the weighing scale. The housing 50 is cup-shaped in form having a bottom wall 51 of the cup adapted to axially position a first hardened steel washer 52 serving as a side guide for a series of bearing balls 53 held within the bearing assembly. An outer race 54 for the bearing balls 53 is axially positioned against the first washer 52 and is radially positioned by engagement with a narrow cylindrical surface 55 of the housing 50. A second hardened steel washer 56 bears against the side of the outer race member 54 and extends radially inwardly far enough to confine the bearing balls 53.

Next in order follow a spacing washer 57 and a thrust disk 58. The assembly of the first washer 52, the outer race 54, the second washer 56, the spacer 57, and thrust disk 58 is held in position in the cup of the housing 50 by a bowed annular clamping ring 59 which, when in place, contacts the thrust disk 58 at diametrically opposed points and contacts a shoulder 60 of a groove in the bore of the cup-shaped housing 50 at points 90° away from its points of contact with the thrust disk 58. This arrangement resiliently and securely holds the members in members in axial position. The only member requiring precise radial control is the outer race 54 of the ball bearing assembly and this race is held solely by its contact along one marginal edge of its periphery with the narrow cylindrical surface 55 of the housing 50. A chart shaft 61 serving as the inner race for the bearing balls is a running fit on the ball bearings 53 and has a diameter slightly greater than any of the six balls so as to fit snugly in position without producing side friction between the balls themselves. A concial hardened end 62 of the shaft 61 lightly bears against the thrust disk 58 to limit axial movement of the chart shaft 61.

This arrangement, similar to the arrangement shown in Figure IX, prevents any stresses placed upon the outer portion of the cup-shaped housing 50 from affecting the dimensions of the outer race 54 of the ball bearing and thus causing binding or friction in the bearings. This assembly is therefore relatively free from frictional or binding effects and provides a highly satisfactory bearing assembly for use in a weighing scale. These improvements of conventional ball bearing supporting structures and lever construction provide means whereby conventional ball bearings may be substituted for knife edges and V-bearings as weighing scale pivotal connections without any sacrifice of accuracy.

Referring again to Figure I, the principle of aligned grooves for positioning studs or bearing members is also applied to the pivotal mountings for the check link 16. The check link 16 is a straight flat bar having a transverse accurate bore at each end, each to receive a half dozen bearing balls. The balls are held in place by side plates spot welded to the sides of the flat bar as shown in Patent No. 2,634,966 to Lawrence S. Williams. One of the side plates at each end is perforated, the other solid.

The upper ends of the posts 17 and 18 are each bifurcated to receive the check link 16 and their upper ends are cross grooved to receive pins 63 and 64 clamped in the grooves at one side of the check link. Similar pins are clamped in the grooves on the other side of the check link. The ends of the pins are rounded and those facing the perforated side plates extend through the side plates and engage the bearing balls. The rounded ends of the pair of pins at each end of the check link engage opposite sides of the solid side plate to hold the check link centered.

This construction permits ready assembly or repair of the check link connections without disturbance of the precise dimensional accuracy required in weighing scale lever systems.

Various modifications of the invention may be made without departing from the scale of the claims.

Having described the invention, I claim:

1. In a device of the class described in combination, a lever having a first V-groove extending along its fulcrum pivot axis and a second V-groove parallel to said first V-groove and extending along its load pivot axis, a stud clamped in each V-groove and extending laterally from the lever, a base having a V-groove that extends along the fulcrum axis of the lever when mounted on the base, a ball bearing assembly mounted in the V-groove of the base and engaging the stud projecting along the fulcrum axis, a load receiving spider, and a ball bearing assembly mounted in the spider and engaging the stud projecting along the load pivot line.

2. In a device of the class described, in combination, a lever having a first V-groove extending along its fulcrum pivot axis and a second V-groove on the same side of the lever extending along a load pivot axis parallel to the fulcrum pivot axis, studs clamped in the V-grooves and projecting laterally beyond the ends of the V-grooves, ball bearings mounted on the projecting studs, a base, a load receiving spider, and means in the base and spider engaging the ball bearings.

3. In a device of the class described, in combination, a lever having laterally spaced apart portions, each portion having a V-groove extending along a load pivot axis and a fulcrum pivot axis parallel to the load pivot axis of the lever, studs clamped in the V-grooves and extending laterally in parallel relationship from the lever portions, ball bearings mounted on the studs, a base having portions to receive the ball bearings on the fulcrum axis of the lever, and a load receiving spider mounted on the ball bearings on the load pivot axis.

4. In a device of the class described, in combination, a member to be rotatably supported, a frame member, a stud projecting from the rotatable member, a ball bearing mounted on the stud, said bearing having an outer race, a bearing housing mounted in the frame member, a housing clamping means secured to the frame member and imposing radial compressive forces on said housing, said housing having a radial wall engaged by and axially positioning said outer race and an annular wall adjacent and integral with the radial wall for engaging a marginal area of the cylindrical periphery of the outer race which is less than half of its axial extent, and means for urging said outer race against said radial wall.

5. In a device of the class described, in combination, a ball bearing for rotatably supporting a load, said bearing including a plurality of balls and an outer race for said balls, a housing for receiving and supporting an outer race of the ball bearing, said housing having a bore that loosely receives the outer race and that terminates in a section that closely engages a marginal area of one end of the ball bearing to a point short of the radial extension of the contact area of said balls with said outer race, a radially extending wall of said housing integral with the walls defining said bore, said surface engaging a side of the bearing adjacent the marginal area, means for urging the bearing into the bore and a housing clamp to support said bearing which imposes radially compressive forces on said housing.

References Cited in the file of this patent

UNITED STATES PATENTS

| | | |
|---|---|---|
| 1,837,601 | Wetzel | Dec. 22, 1931 |
| 2,083,413 | West | June 8, 1937 |
| 2,117,387 | Williams et al. | May 17, 1938 |
| 2,387,202 | Williams | Oct. 16, 1945 |
| 2,490,723 | Williams | Dec. 6, 1949 |
| 2,578,957 | Williams | Dec. 18, 1951 |
| 2,634,966 | Williams | Apr. 14, 1953 |
| 2,688,519 | Williams | Sept. 7, 1954 |